United States Patent [19]

Robbins

[11] Patent Number: 4,472,325
[45] Date of Patent: Sep. 18, 1984

[54] LIQUID DISTRIBUTOR APPARATUS FOR A VAPOR-LIQUID CONTACT COLUMN

[75] Inventor: Lanny A. Robbins, Midland, Mich.

[73] Assignee: The Dow Chemical Company, Midland, Mich.

[21] Appl. No.: 504,012

[22] Filed: Jun. 13, 1983

[51] Int. Cl.$^3$ .............................................. B01F 3/04
[52] U.S. Cl. ......................................... 261/96; 261/97
[58] Field of Search ................... 261/96, 97; 422/195, 422/220; 202/232

[56] References Cited

U.S. PATENT DOCUMENTS

| 3,232,590 | 2/1966 | Eckert | 261/97 |
| 3,259,380 | 7/1966 | Brown | 261/97 |
| 3,281,133 | 10/1966 | Eckert | 261/97 |
| 3,489,529 | 1/1970 | Dudych et al. | 422/195 |
| 3,824,081 | 7/1974 | Smith et al. | 422/220 |
| 4,432,913 | 2/1984 | Harper et al. | 261/97 |

FOREIGN PATENT DOCUMENTS 1337771 11/1973 United Kingdom .................. 261/97

OTHER PUBLICATIONS

Support Plates and Distributors for Packed Towers; Bulletin TA-30; U.S. Stoneware Co.; Akron, Ohio; Cpr. 1957; pp. 17-21.

Primary Examiner—Tim R. Miles
Attorney, Agent, or Firm—V. Dean Clausen

[57] ABSTRACT

An apparatus is disclosed for distributing a downflowing liquid uniformly across the packed bed of a vapor-liquid contact column. The apparatus consists of a distributor unit and a parting manifold. The distributor unit includes a plate with upstanding walls positioned crosswise and lengthwise on the plate to define separate, open-top compartments. Installed in each compartment are a number of drip tubes which extend above and below the plate. Gas riser openings are positioned between certain compartments and the distributor unit is mounted inside the column above the packed bed. The parting manifold is mounted above the distributor unit, and it includes a header circuit, crosswise end conduits, a crosswise lateral conduit, and a vertical standpipe conduit. The end conduits and lateral conduit have closed ends and each includes outlet ports therein. The downflowing liquid enters the manifold through the standpipe conduit, drops through the outlet ports into each compartment, and flows downwardly through the drip tubes onto the packing.

5 Claims, 5 Drawing Figures

LIQUID DISTRIBUTOR APPARATUS FOR A VAPOR-LIQUID CONTACT COLUMN

BACKGROUND OF THE INVENTION

The invention relates to an apparatus for distributing a liquid across the packed bed of a vapor-liquid contact column.

Packed columns for vapor-liquid contact are used in various operations, such as distillation, fractionation, absorption, stripping and heat exchange. The columns are usually filled with randomly-oriented packing material, but sometimes it is carefully positioned. These operations usually involve counter-current flow of the vapor and liquids in the column, but the flow can also be co-current. Some operations require a column which has only a single bed of packing therein, with one device for distributing liquid onto the packing. In these columns the device is mounted above the packed bed and it is known as a liquid "distributor". Other operations require a column that has more than one packed bed. In this instance the column includes additional distributing devices, which are positioned between the packed sections and are known as liquid "redistributors".

Many conventional liquid distributors are of the trough (or tray) type. These distributors consist of elongate troughs with closed ends, which are spaced apart and arranged in parallel relation. Triangular or rectangular-shaped weirs are cut into the sides of the troughs, or there are spaced orifices along the bottom wall of each trough. Mounted above the troughs are box-like structures referred to as parting boxes or splitters. The distributor assembly described above is mounted in the column above the packed bed. In a vapor-liquid contact operation, the liquid usually enters the parting boxes from a source outside the column, and is fed from the boxes into the troughs. As the liquid overflows the weirs (or passes through the orifices), it falls onto the packing in the column. Vapor entering the bottom of the column rises upwardly through the packing, where it contacts the downflowing liquid and passes between the spaced apart troughs.

The function of the distributors and redistributors in vapor-liquid contact operations is to ensure uniform wetting of the packing material. If the packing is wet unevenly, a condition usually referred to as "maldistribution", the desired transfer of mass and heat between the vapor and liquid phases is, at best, very poor. Maldistribution usually results in poor separation of components in the column, and it can have other detrimental effects, such as material decomposition in processes which utilize temperature-sensitive liquids as one of the reactants.

Maldistribution is a common problem in packed columns having large diameters, that is, wider than about eighteen inches. In addition, this problem is particularly acute in operations, such as vacuum fractionation, where the liquid loading per cross-sectional area of the column is low. In the larger columns the longer span of the distributor troughs makes it much more difficult to hold the troughs in a level position. Most liquid distributing troughs are not precisely level when installed. Later, as the column shifts, the troughs become even further out of level. In a trough which is not level, the liquid collects at the lower end of the trough and the higher end is thus "starved" for liquid.

In vacuum fractionation, and other operations which require a low flow rate of liquid from the trough to the packing, the liquid must drain through very small orifices or weirs in the troughs. The main problem in distributor troughs of this type is that solids in the liquid tend to plug off the drain orifices or weirs.

SUMMARY OF THE INVENTION

The apparatus of this invention is useful for distributing a downflowing liquid uniformly across a packed bed of a vapor-liquid contact column. The apparatus is made up of a distributor unit and a parting manifold. Basic components of the distributor unit are a plate and several upstanding walls, which are fastened along one edge to the plate. One of the upstanding walls defines the periphery of the plate. The other walls are positioned both crosswise and lengthwise of the plate to define separate, open-top compartments within the distributor unit. A set of drip tubes are installed in each compartment. These tubes are defined by upstanding tubular members which extend above and below the plate.

The plate includes gas risers, which are openings positioned between certain compartments. The parting manifold is mounted above the distributor unit, and it includes a header conduit, with end conduits being joined, in crosswise relation, to opposite ends of the header conduit. In addition, a lateral conduit is joined, in crosswise relation, to the header conduit between the end conduits, and the end conduits and lateral conduit are closed at each end. The manifold also includes a number of outlet ports therein, which are located above and which face toward the open-top compartments. Also joined to the header conduit is a standpipe conduit, which is positioned in perpendicular relation to the header conduit between the end conduits.

In the operation of this apparatus the downflowing liquid enters the parting manifold through the standpipe conduit, drops through the outlet ports into each compartment of the distributor unit, and flows downwardly through the drip tubes, in a uniform pattern, onto the packed bed.

DETAILED DESCRIPTION OF THE INVENTION

Figure 1:
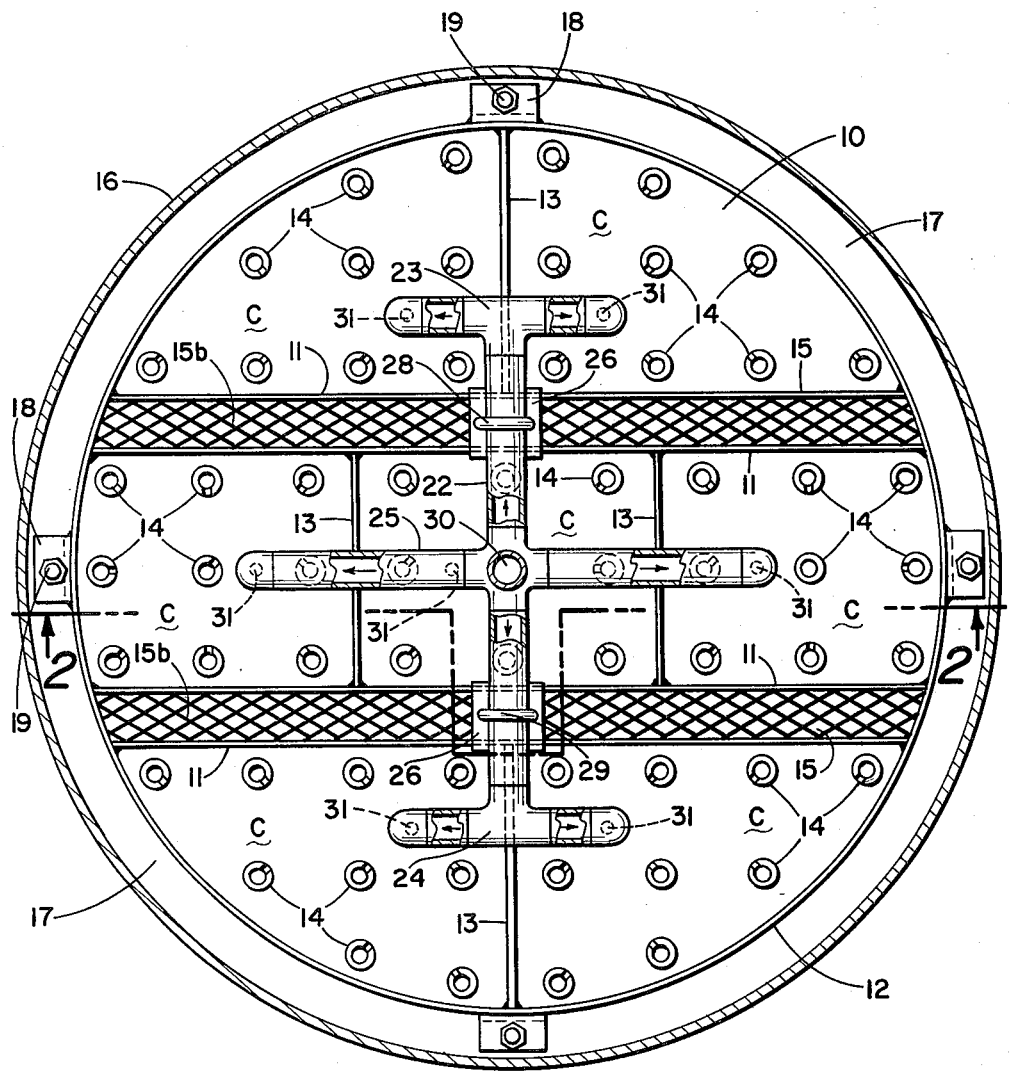
FIG. 1 is a plan view, partly in section, of one embodiment of the liquid distributing apparatus of this invention.

Referring to the drawing, particularly FIG. 1, the distributor apparatus of this invention is generally made up of two components, namely, a distributor unit and a parting manifold. Looking first at the distributor unit, the bottom of this unit is defined by a flat, circular plate 10. Several upstanding wall members are fastened to the top surface of the plate 10, along the bottom edge of each of the wall members. Some of the wall members, indicated by numeral 11, are positioned crosswise of plate 10. These walls are joined at each end to a single upstanding wall 12, which defines the periphery of plate 10.

The other upstanding wall members in the distributor unit, as indicated by numeral 13, are positioned lengthwise of plate 10. As shown in FIG. 1, two of the walls 13 are fastened at one end into the peripheral wall 12, and at the other end into one of the inside walls 11. The other two walls 13 fasten at each end into the remaining inside walls 11. The lengthwise and crosswise arrangement of walls 11 and 13 thus defines several open-type compartments in the distributor unit. Each of these compartments is designated by the letter C.

A set of drip tubes is installed in each of the compartments. These tubes, indicated by numeral 14, are defined by upstanding tubular members which extend above and below the plate 10 and are fastened into the plate. Plate 10 also has two rectangular openings therein, each indicated by numeral 15, which provide gas risers in the plate. An annular gas riser is also provided by an annular space 15a, which is defined between the outer wall surface of the peripheral wall plate 12 and the inner wall surface of the column 16. Two large mesh screens, each indicated by numeral 15b, are fastened to the underside of plate 10, such that they cover the gas riser openings 15. These pieces prevent migration of the packing up through the risers. Another large mesh screen 15c is fastened to the periphery of plate 10, such that it hangs straight down from the plate. This piece prevents the packing from migrating into the annular riser 15a.

Figure 2:
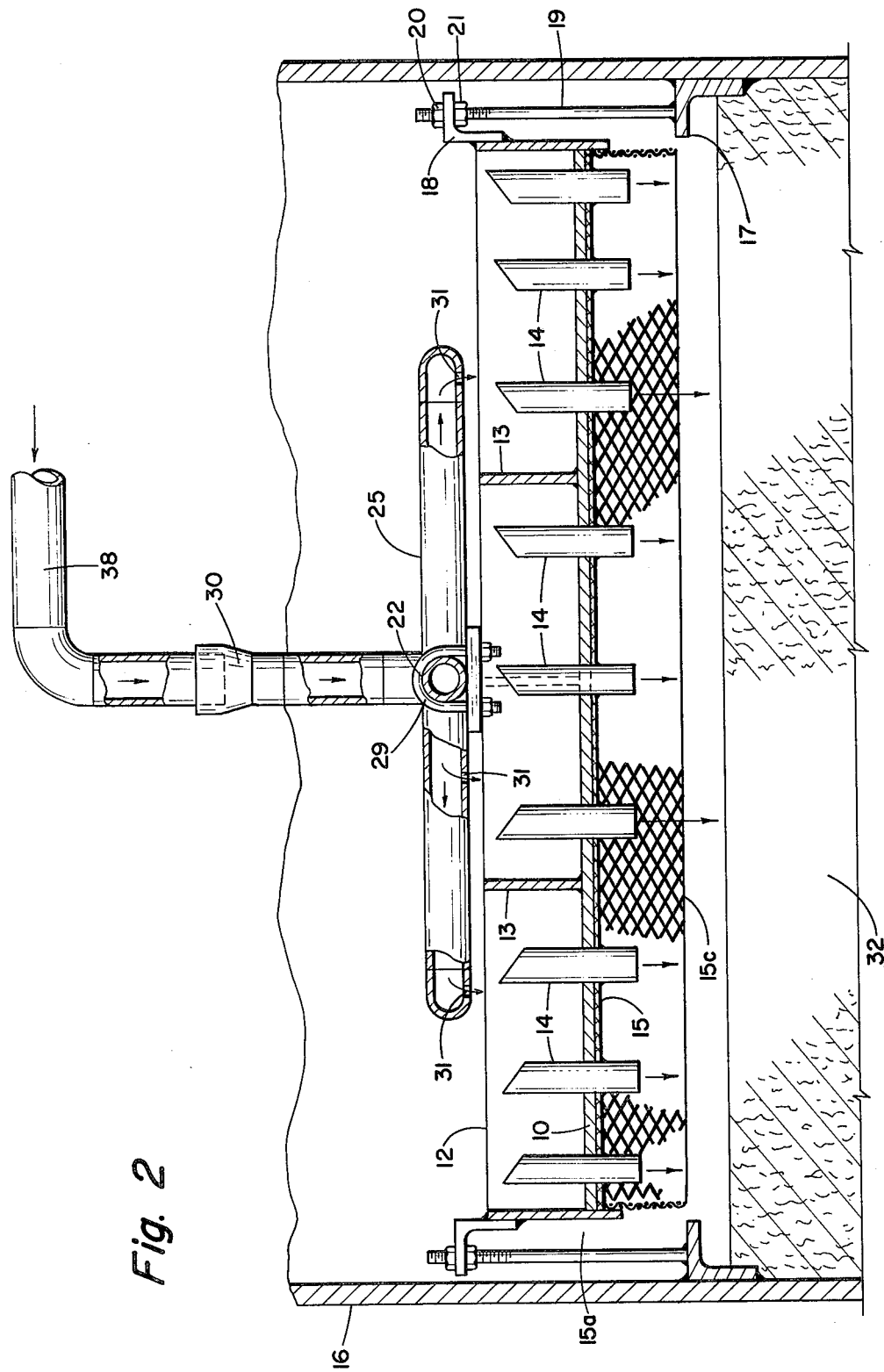
FIG. 2 is an elevation view, partly in section, of the distributing apparatus of FIG. 1, taken along line 2—2.

A support ring 17, which is welded to the inside wall surface of column 16, provides a means for supporting the distributor unit. Referring particularly to FIG. 2, a number of leveling lugs 18 are welded to the outside surface of the peripheral wall 12 at the top of this wall. The lugs fit down over threaded hold-down bolts 19, which are welded to the support ring 17. Each leveling lug is secured to its corresponding hold-down bolt by a pair of nuts 20 and 21, which are positioned on opposite sides of the lug to provide for raising or lowering the distributor unit to make it level.

Referring now to the parting manifold, the device includes a header conduit 22, end conduits 23 and 24, and a lateral conduit 25. The end conduits are joined, in crosswise relation, to opposite ends of the header conduit. The lateral conduit is also joined, in crosswise relation, to the header conduit at a point between the end conduits. Both of the end conduits and the lateral conduit are closed at each end. As illustrated herein, the manifold structure is mounted above the distributor unit. The manifold sets on two plates 26 and 27. Each of these plates straddles the crosswise walls 11 of the distributor unit and is welded to the top edge of these walls, to form a support.

Figure 5:
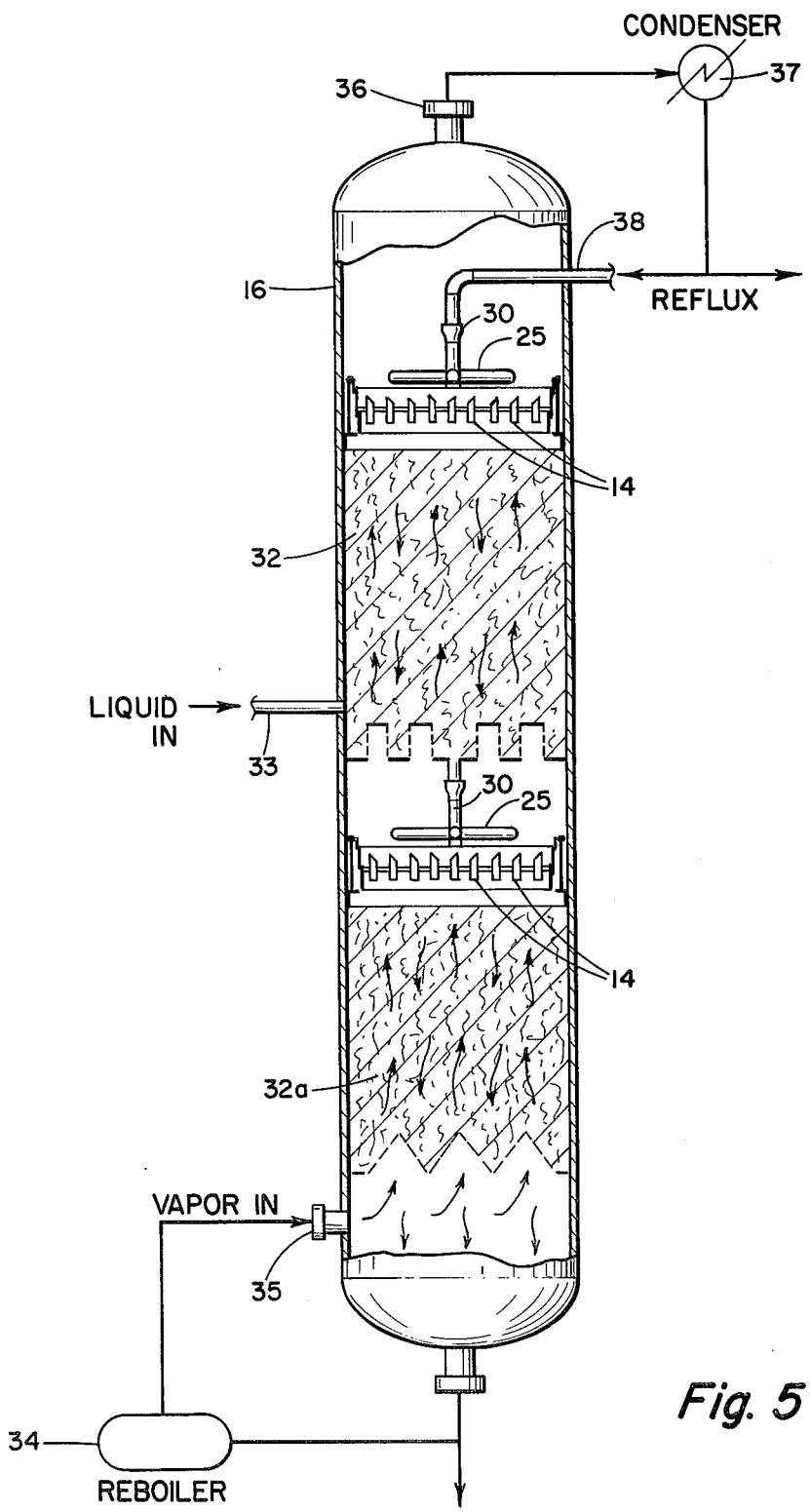
FIG. 5 is a schematic view of a packed column, in which are installed two of the distributor devices of this invention. In this view the device at the top of the column is utilized as a liquid distributor and the device located farther down in the column functions as a liquid redistributor.

As shown in FIGS. 1 and 2, the header conduit 22 is fastened to the plate supports by U-bolt fasteners 28 and 29. The parting manifold also includes a liquid inlet in the form of a standpipe conduit 30, which is perpendicular to the header conduit 22 and is joined to the header conduit between the end conduits 23 and 24. A number of outlet ports 31, located on the underside of the end conduits 23 and 24, and the lateral conduit 25, provide for the flow of liquid from the manifold into each of the compartments C in the distributor unit. As shown in FIG. 2, the distributor apparatus of this invention is rounted above the packed bed 32 in the column 16. In FIG. 2 the distributor apparatus is positioned at the top of the column, a position which corresponds to the top distributor in FIG. 5.

Figure 3:
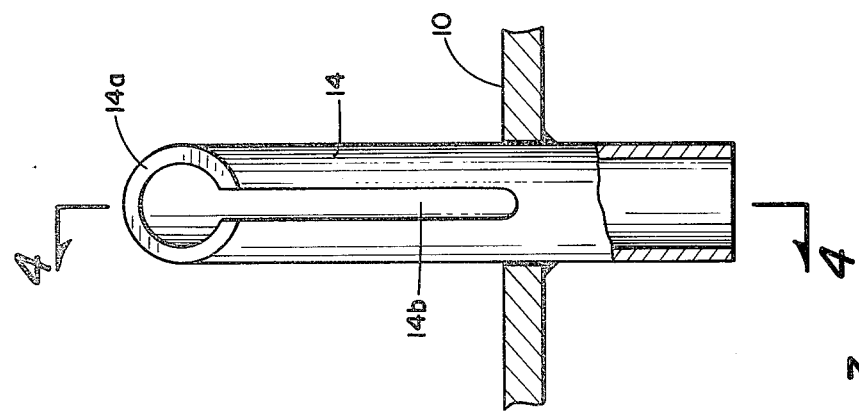
FIG. 3 is a detail view of one of the drip tube components of the distributing apparatus illustrated in FIGS. 1 and 2. This view is taken on the front side of the drip tube.
Figure 4:
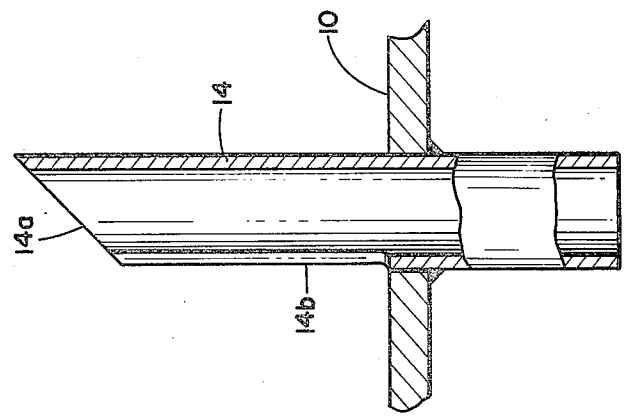
FIG. 4 is a second detail view of the drip tube component shown in FIG. 3, with this view being taken along line 4—4.

As illustrated in FIGS. 3 and 4, the top end 14a of each of the drip tubes 14 is slanted in relation to the top surface of plate 10. Also, each drip tube has a lengthwise slot 14b therein, which extends from the lowest point on the top end of the tube down to the top surface of plate 10. The slanted top end, in combination with the lengthwise slot, makes each drip tube a structure having a compound weir effect. The use of the drip tubes in plate 10, for liquid distribution, has certain advantages over the use of holes in a plate for this purpose. A primary advantage is that the tubes and the weirs (slots) therein allow small solid particles to pass through the distributor unit without plugging it. The weirs in the drip tubes also have another advantage, in that the distributor unit can be drained free of liquid when the vapor-liquid contact operation is shut down. This feature helps to prevent unintentional contamination of the maintenance personnel.

OPERATION

The invention can be illustrated by describing a typical operation in which the present distributing apparatus is used in a packed column for a distillation operation. In the distillation operation, which is illustrated schematically in FIG. 5, the distributor apparatus is used at the top of the column as a liquid distributor, but further down in the column the same apparatus functions as a liquid redistributor. For the purpose of this description, assume that the liquid feed stream is a solution of ethanol in water, and that the distillation operations is continuous (as opposed to a batchwise procedure).

During the operation, the liquid reflux stream enters column 16 through the reflux inlet 38 and trickles down through the packing in the upper bed 32. At the bottom of bed 32, which is referred to as the rectification section, the downwardly moving liquid is collected, mixed with the liquid feed which enters the column through inlet 33, and directed into the standpipe 30 of the redistributor apparatus positioned below this packed section. From the distributor apparatus, the liquid falls through the drip tubes 14 and flows downwardly through the lower packed bed 32a, referred to as the stripping section, and is collected at the bottom of the column. Part of the bottoms liquid is directed into a reboiler 34 and vaporized. The vapor phase is carried back into the column through the inlet 35 and it moves upwardly in the column through both of the packed beds 32a and 32.

At the top of the column the overhead vapors are carried out of the column through outlet 36 and into condenser 37. The condensed vapors provide the reflux liquid, which is returned to the column through reflux line 38. The reflux liquid enters the distributor apparatus through standpipe 30 and from there it is distributed onto the upper packed bed 32. As the liquid trickles down through the rectification section (bed 32) and stripping section (bed 32a) of the column, it is moving counter-current to the vapor phase, which is rising upwardly through the column. The rising vapors strip the ethanol out of the falling liquid and this product, which is rich in ethanol, is carried into the condenser 7. From the condenser the liquid stream is split into reflux, which enters the column through the inlet line 38, and a distillate product stream, which is directed to a receiving vessel (not shown).

The liquid distributing apparatus of this invention has certain features which give it a distinct advantage over most of the commercially available devices. One of these features is the compartmented structure of the distributor unit. Each compartment in the distributor unit defines an enclosure beyond which the liquid cannot move, even if the distributor apparatus is not level. This prevents the problem mentioned earlier, in which one end of the distributor trough can be "starved" for liquid if the trough is not level.

Another desirable feature is that the present distributor apparatus can be used for operations which require either high liquid loading, or low liquid loading, based on the cross-sectional area of the column. The capability of this apparatus to uniformly distribute the liquid in a low loading situation is particularly significant, since most of the prior distributor devices are not satisfactory for such operations. For example, as explained earlier, where the liquid loading requirements are low, the prior devices distribute the liquid through small orifices in a parting pipe, or it is distributed over weirs in a trough. Both of these structures have major drawbacks. One problem is that the small orifices tend to plug with solid matter; a second problem is that when the troughs are not level, particularly in large diameter columns, maldistribution of the liquid is a common occurrence.

The distributing apparatus of this invention avoids the problems described above. Referring particularly to FIG. 1, note that in the parting manifold there is only one outlet port 31 above each of the compartments C in the distributor unit. This means that each of the outlet ports can be of a reasonably large diameter, since all of the liquid for a given compartment flows through only one outlet port. The actual diameter of each outlet port 31 is determined by the flow rate of liquid distributed to each compartment C and the desired liquid head in the standpipe 30. The size of each outlet port 31 can be reasonably large, because the flow rate of liquid through each outlet port is much larger than the flow rate of liquid that passes through each drip tube. For example, in the distributor unit illustrated herein, as noted in Figure 1, there are nine (9) drip tubes in each compartment, which means that the flow through each outlet port 31 can be nine (9) times greater than the flow through each of the tubes. To sum up, therefore, it is the liquid loading requirement (flow rate) for each vapor-liquid contact operation which directly determines the actual operating conditions, such as the size of the outlet ports, the number and size of the drip tubes in each compartment, the size and shape of the slots in the drip tubes, and the like.

The invention claimed is:

1. Apparatus for distributing a downflowing liquid uniformly across the packed bed of a vapor-liquid contact column, the apparatus comprises:
a distributor unit which includes a plate and several upstanding wall members, the wall members are fastened along one edge to the plate, one upstanding wall member defines the periphery of the plate and the other wall members are positioned crosswise and lengthwise of the plate to define separate, open-top compartments within the distributor unit, a set of drip tubes are installed in each compartment, the drip tubes are defined by upstanding tubular members which extend above and below the plate and are fastened to the plate, and the distributor unit is mounted inside the column, crosswise of the column, and above the packed bed;
a parting manifold mounted above the distributor unit, the manifold includes a header conduit, end conduits are joined, in crosswise relation, to opposite ends of the header conduit, a lateral conduit is joined, in crosswise relation, to the header conduit between the branch conduits, the end conduits and lateral conduit are closed at their respective ends, the manifold has a number of outlet ports therein, which are located above and face toward the open-top compartments, and a standpipe conduit is joined, in perpendicular relation, to the header conduit between the end conduits;
the apparatus includes a number of gas risers in the plate, as defined by openings located in the plate between certain compartments, and the apparatus further includes an annular gas riser, as defined by an annular space between the upstanding wall member at the periphery of the plate and the inner wall surface of the column;
wherein, the downflowing liquid enters the parting manifold through the standpipe conduit, drops through the outlet ports into each compartment of the distributor unit, and flows downwardly through the drip tubes, in a uniform pattern, onto the packed bed.

2. The apparatus of claim 1 in which the top end of each drip tube defines a surface which is slanted in relation to the top surface of the plate.

3. The apparatus of claim 2 in which each drip tube has a lengthwise slot therein, and the slot extends from the top surface of the plate to the lowest point on the slanted top end of each drip tube.

4. The apparatus of claim 1 in which the outlet ports in the manifold are positioned such that there is only one outlet port located above each compartment.

5. The apparatus of claim 1 in which there is an equal number of drip tubes installed in each of the open-top compartments.

* * * * *